United States Patent [19]

Balek

[11] Patent Number: 4,854,540

[45] Date of Patent: Aug. 8, 1989

[54] VEHICLE BATTERY MOUNTING APPARATUS

[75] Inventor: Lynn A. Balek, Mason City, Iowa

[73] Assignee: LIL Industries Ltd., Mason City, Iowa

[21] Appl. No.: 161,731

[22] Filed: Feb. 29, 1988

[51] Int. Cl.$^4$ .................. A47B 97/00; B60R 18/02
[52] U.S. Cl. ................................. 248/503; 180/68.5
[58] Field of Search ............ 248/503, 500, 510, 311.2, 248/310; 180/68.5

[56] References Cited

U.S. PATENT DOCUMENTS 1,591,940  7/1926  Joyce ................................. 180/68.5
2,574,174  11/1951  Dyrdahl .......................... 211/126 X

FOREIGN PATENT DOCUMENTS 1181267  6/1959  France ................................. 248/503

Primary Examiner—Alvin C. Chin-Shue
Attorney, Agent, or Firm—G. Brian Pingel

[57] ABSTRACT

An apparatus for holding a battery of a vehicle. A mounting frame is attached to a vertical surface of the vehicle and supports a detachable box in which the battery is retained. A pair of slide members on the mounting frame are slidably receivable within a corresponding pair of guide members on the box so as to permit vertical slidable adjustment of the box relative to the mounting frame. The box may be held in either a transport or an access position by a latching mechanism consisting of a pair of hooks attached to the box and a pair of channels on the mounting frame. A pair of perforations in the channels receive the hooks and define the transport and access positions of the box.

6 Claims, 3 Drawing Sheets

VEHICLE BATTERY MOUNTING APPARATUS

BACKGROUND OF THE INVENTION

The invention relates to apparatus for mounting vehicle batteries and, more specifically, to an apparatus for holding and supporting a vehicle battery in a transport and in a servicing position.

Batteries for vehicles are almost universally of the lead-acid type, having a plurality of distinct cells in which lead electrodes are immersed in an acidic solution. The interior of the cells frequently is accessible through a port on the top of the battery, through which the cells may be visually inspected and serviced, if necessary, by addition of water or other solutions. The corrosive acid of the battery can accidently leak out of the battery enclosure, whether through the cell port or through a crack or rupture in the battery enclosure. Further, the battery terminals foul or corrode over time. If the battery acid is allowed to escape, either of these occurrences may damage the vehicle near the location of the battery.

Prior to the use of electric starters, vehicles had no batteries and were started by hand cranking of the engine. These vehicles were manufactured and sold without a mounting location for a battery. If such older or antique vehicles are converted to electric start, a means for mounting a battery must be provided. Because such older vehicles are usually quite valuable, damage from the corrosive acids of vehicle batteries is to be carefully avoided.

Not all vehicles are used year-round but, particularly in severe northern climates, are stored or warehoused for extended periods during a portion of the year. The battery is usually removed from the vehicle during storage to prevent its slow discharge and eventual ruin that may occur if left in the vehicle. Conventional means for mounting vehicle batteries do not permit easy removal and replacement.

The present invention provides an apparatus that is mounted in the vehicle for receiving and retaining a vehicle battery. A box of the apparatus holds the battery and is open at the top to permit easy access to the terminals and cells of the battery. Access is further facilitated by means which permit the box to be lowered relative to its mounting bracket or frame. The open box portion is also removable from the mounting frame to remove easily the battery from the vehicle. The base and sides of the box portion are closed and impermeable to prevent the escape of acid that may leak from the battery.

SUMMARY OF THE INVENTION

The invention is an apparatus for mounting a vehicular battery in a vehicle. The apparatus includes a mounting bracket or frame for supporting in at least two positions a box which holds the battery. The mounting frame has a web portion which is attached to the vehicle and an extended leg portion at either end of the web portion. Mounted on the inner surface of each leg portion is a vertical slide member. Each of the slide members is received within a corresponding guide member which is mounted on the outer surface of the side walls of the box. The position of the box relative to the mounting frame is thereby slidably adjustble. A pair of hooks are mounted on either side of the box at one end thereof for pivotal movement relative to the box. A preforated channel member is mounted on the outer surface of each leg portion of the mounting frame. The other or free end of the hooks are insertable within any one of a pair of perforations in the channel members. the box is closed on the sides and bottom to isolate the battery from the local environs of the vehicle, but is open at the top to permit access to the battery.

DETAILED DESCRIPTION OF A PREFERRED EMBODIMENT

Figure 1:
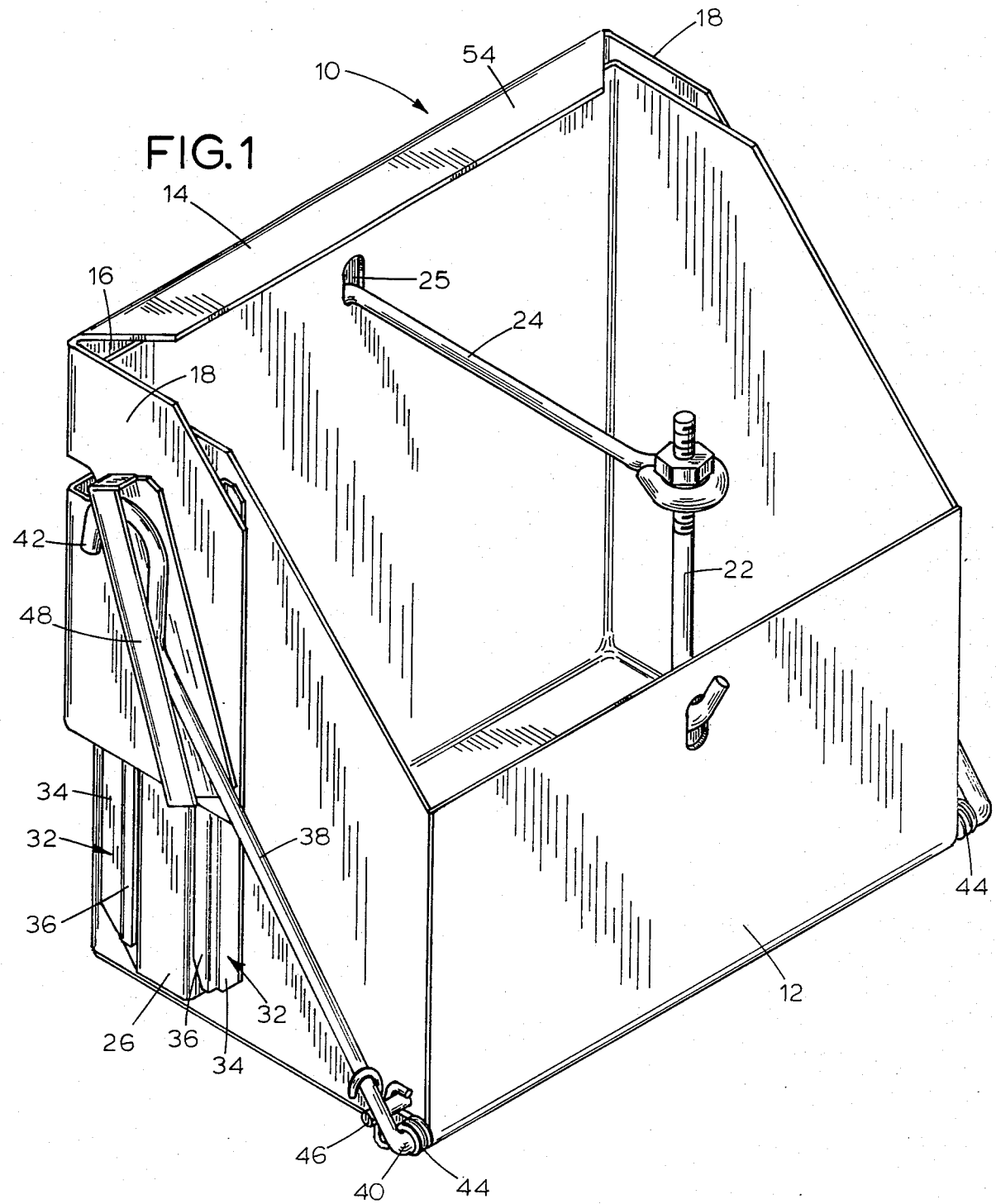
FIG. 1 is a perspective view of the apparatus for holding a vehicle battery.

The present invention is an apparatus, indicated in FIG. 1 generally at 10, for holding a battery of a vehicle (not shown). The apparatus 10 includes a battery receiving box 12 which is supported on a mounting frame 14. The mounting frame 14 is generally U-shaped in longitudinal cross section, having a base or web portion 16 from either end of which extends a leg portion 18. The web portion 16 is adapted for attachment to a vertical surface of a vehicle. Of course, the mounting frame 14 may also be attached to any convenient vertical surface where a battery may desirably be located.

The box 12 is of a generally rectangular shape having closed side and bottom portions and an open top. Preferably, the side wall portions of the box 12 are shorter at the front of the box to facilitate access to a battery that will be retained inside the box 12, as illustrated in FIGS. 2 and 3.

Figure 2:
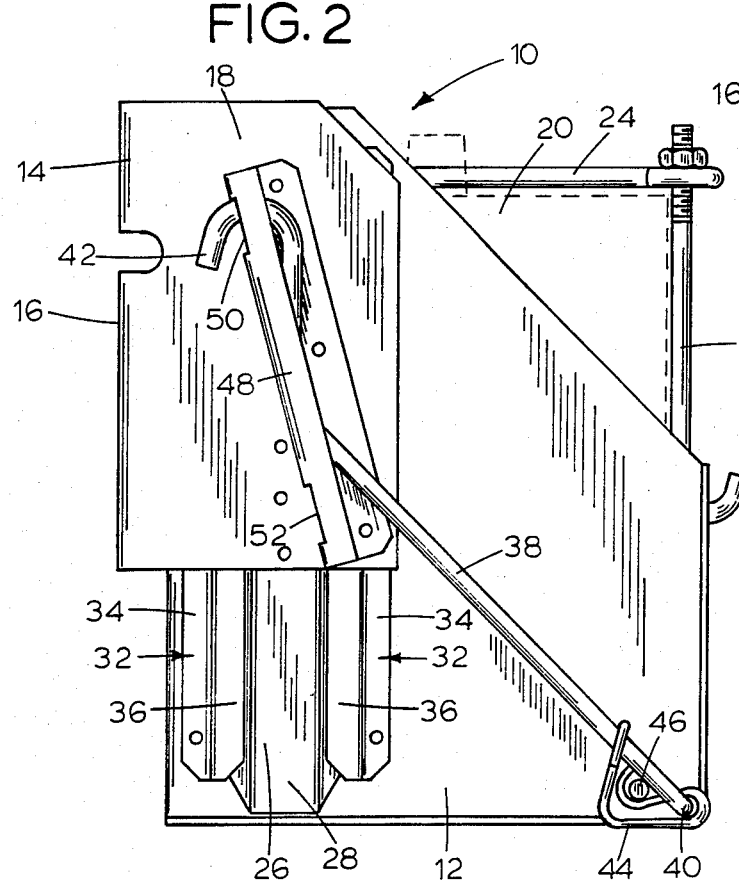
FIG. 2 is a side elevational view of the apparatus with a battery shown in dotted line.
Figure 3:
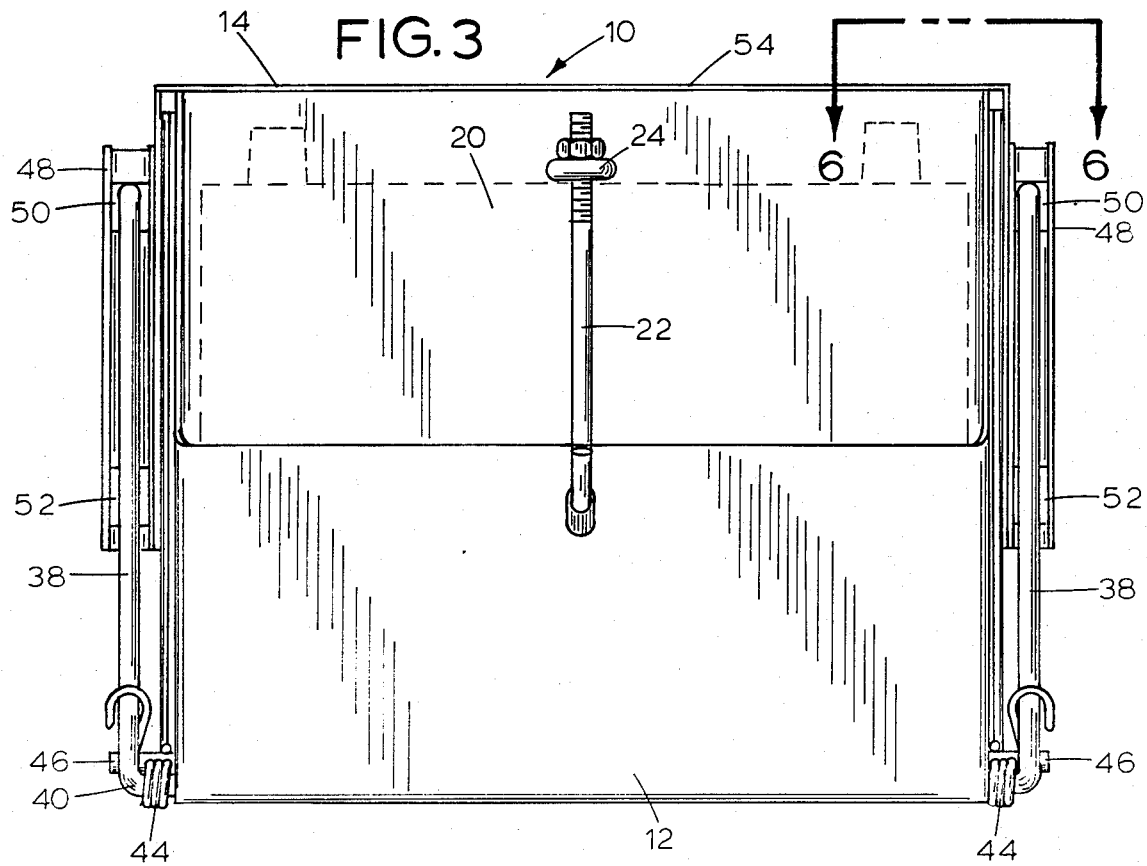
FIG. 3 is a front elevational view of the apparatus with a battery shown in dotted line.

The battery 20, illustrated in dotted line in FIGS. 2 and 3, is positively retained inside the box 12 by means of a nut and bolt combination 22 and an eye member 24. the rearward end portion of the eye member 24 is releasably held behind a portion of the back wall of the box 12 near a perforation 25 therein. To insert a battery in the box, the nut is removed from the nut and bolt combination 22, the eye member 24 is pivoted upwardly, the battery is inserted, and the eye end portion of eye member 24 is placed over the bolt 22. The nut is then inserted onto the bolt and tightened snugly, as illustrated in FIGS. 2 and 3. The battery 20 is thus retrained against movement and will not be dislodged from inside the box 12 by movements of the vehicle.

Figure 4:
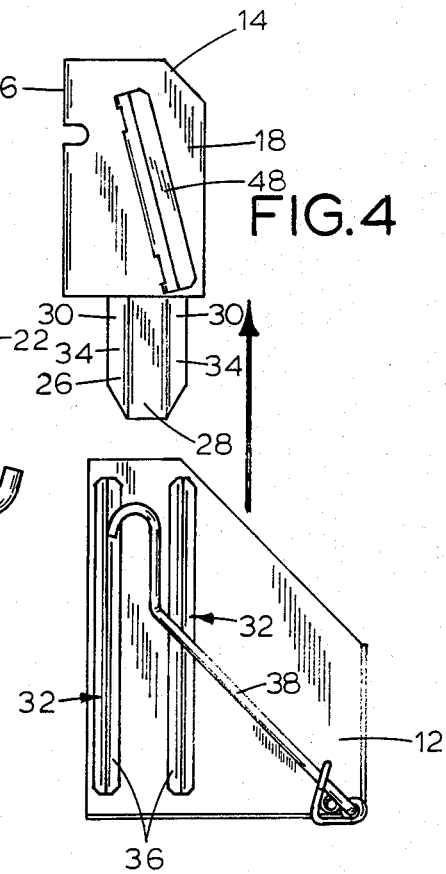
FIG. 4 is a side elevational view of the box removed from the mounting frame and showing how the box is slidably received by the mounting frame.
Figure 6:
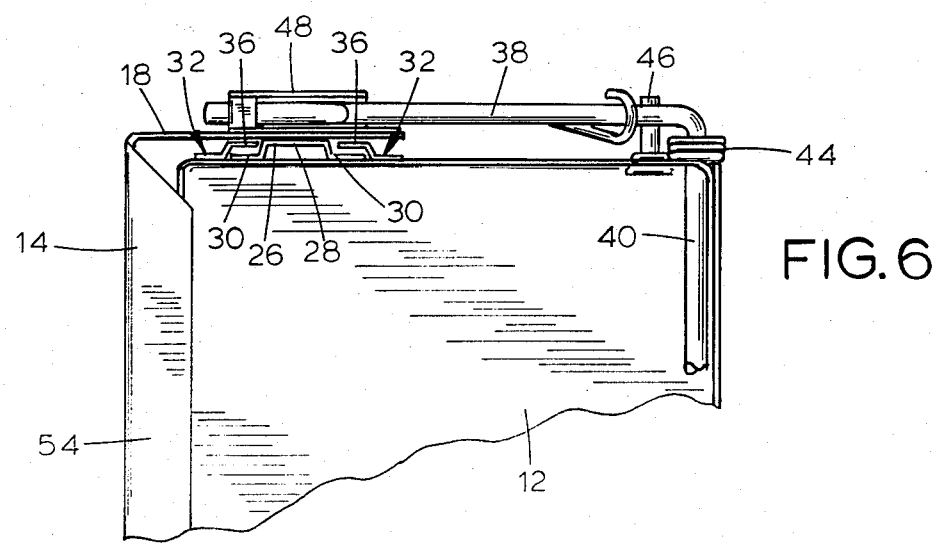
FIG. 6 is a partial top view showing the latch mechanism.

Mounted on the inwardly facing surface of the leg portions 18 of the mounting frame 14 are a pair of slide members 26. The slide members 26 include a base portion 28, which is attached by spot-welding or other suitable means to the leg portion 18 of the mounting frame 14, and a pair of slide legs 30 which extend outwardly from either side of the base portion 28, as best illustrated in FIGS. 4 and 6.

Corresponding to the slide members 26 are guide members 32 mounted on either side of the box 12. Each guide member 32 consists of a pair of parallel, spaced-apart guide elements which, as best illustrated in FIG. 6, have a base portion 34, attached (again, by spot-welding or other suitable means) to the side wall of the box 12, and an inwardly extended leg 36 that is spaced away from the side wall of the box 12. The slide members 26 are adapted to be received between the guide members 32 upon sliding assembly of the box 12 and mounting frame 14. As illustrated in FIG. 4, to assemble the apparatus, the box 12 is centered below the mounting frame 14 with the base portion 28 of the slide members 26 centered between the guide elements of the guide members 32. Upon upward movement of the box 12 in the direction of the arrow in FIG. 4, the extended legs 30 of the slide portion 26 will be received underneath the leg portions 36 of the guide members 32, as best illustrated in FIG. 6. The box 12 is, accordingly, slidably movable with respect to the mounting frame 14 along the line of the arrow in FIG. 4, but is restrained against movement in any direction transverse to the line of the arrow in FIG. 4.

The position of the box 12 relative to the mounting frame 14 is adjustable between two fixed positions by means of a latch mechanism relating means. The latch mechanism includes a hook 38 mounted for pivotal movement about axis 40 at the lower front corner of each of the side walls of the box 12. A terminal end portion 42 of the hook 38 is curved through an angle of approximately 180 degrees. The hook 38 is urged downwardly by a spring clip 44 which acts between a peg 46 of the side wall of the box 12 and a portion of the lower end portion of the hook 38.

Figure 5:
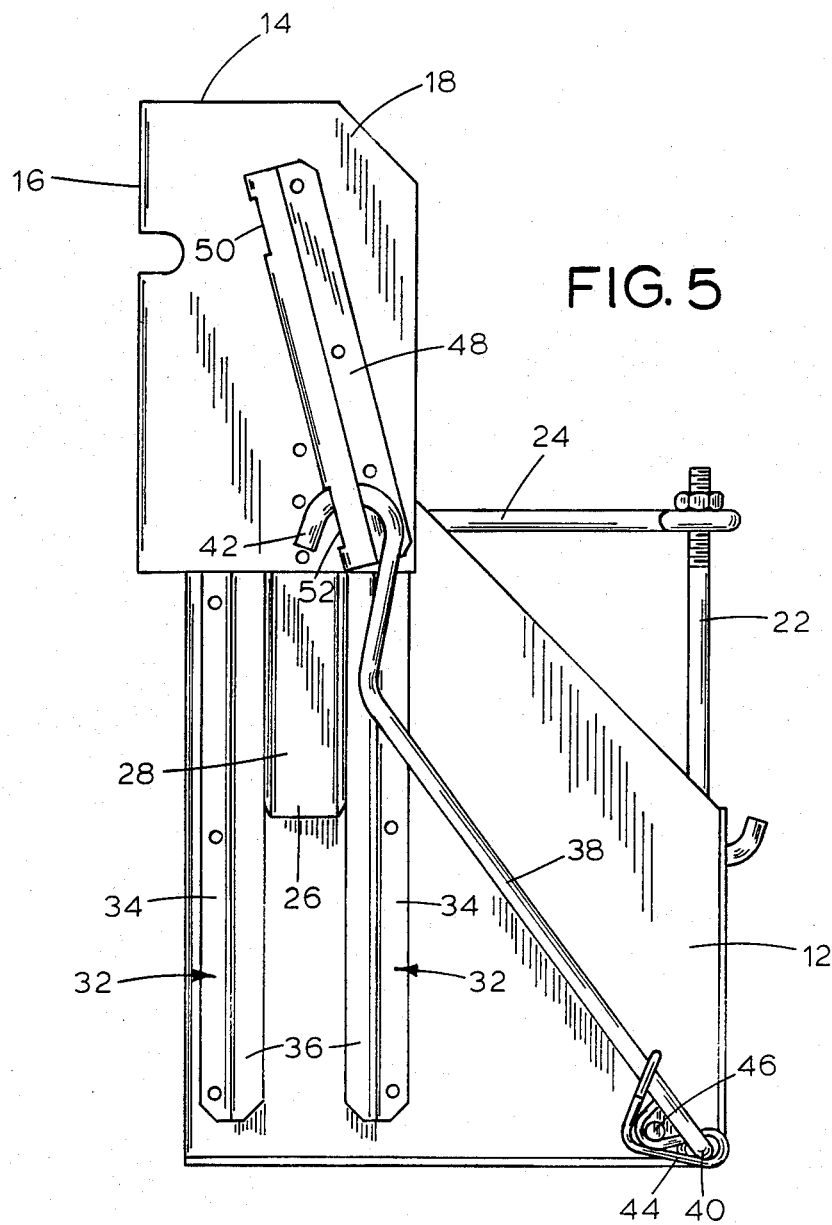
FIG. 5 is a side elevational view of the apparatus in the lower or access position therefor.

The latch mechanism also includes a pair of channel members 48 which are attached to the outer surface of the leg portions 18 of the mounting frame 14. The base of the channel members 48 is perforated in two locations, upper perforation 50 and lower perforation 52, which define stops for the hooks 38. The terminal end portion 42 of the hook 38 may be positioned within either perforation 50 (as illustrated in FIGS. 1, 2, 3, and 6) or within lower perforation 52 (as illustrated in FIG. 5). The hooks 38 and perforations 50 and 52 thus define an upper or transport position of the box 12 relative to the mounting frame 14 (as illustrated in FIGS. 1, 2, 3, and 6) and a lower or access position (as illustrated in FIG. 5). The spring 44 acts to ensure that the terminal end portions 42 of the hooks 38 stay within the perforations 50 and 52 so as to prevent movement of the box 12 relative to the mounting frame 14. The terminal end portions 42 can be manually frame 14. the perforations 50 and 52, however, by pivoting upwardly the hooks 38 against the spring 44 whereupon the box 12 may be raised or lowered with respect to the mounting frame 14.

For example, after securing the mounting frame 14 to a vertical surface of the vehicle, the box 12 is centered beneath the mounting frame 14 and moveded upwardly in the direction of the arrow in FIG. 4. The hooks 38 are manually retracted or pivoted in a direction to permit the hooks to clear the channel members 48. Upward movement of the box 12 is limited by abutting egagement of the back or rear panel of the box 12 against a lip 54 of the mounting frame 14 (FIGS. 1 and 6). The hooks 38 can now be released whereupon the terminal end portions 42 will be received within perforations 50. The box will now be held in its upper or transport position.

If it is desired to facilitate access to the battery being held inside the box 12, the box 12 may be moved from its upper or transport position to its lower or access position by manually pivoting the hooks 38 in the direction to remove their terminal end portions 42 from the perforations 50. The box 12 can now be lowered until in a position where the terminal end portions 42 of the hooks 38 will be received within the lower perforations 52 of the channel members 48. The box 12 will now be retained in its lower or access position.

The apparatus 10 is perferably made from a strong, durable, and corrosion resistant material sufficient to support the weight of a battery mounted in the box and that will resist the corrosive effects of any acid that may escape the enclosure of the battery. In the preferred embodiment, the apparatus is made of stainless steel. Of course, other suitable materials may be used that have the properties described above.

Although the invention has been described with respect to a preferred embodiment thereof, it is to be understood that is not to be so limited since changes and modifications can be made therein which are within the full intended scope of this invention as defined in the following claims.

I claim:

1. An apparatus for holding a battery of a vehicle, comprising:
   (a) a mounting frame for attachment to the vehicle;
   (b) a box for receiving the battery;
   (c) coacting guide means on said frame and said box to semi-permanently secure said box to said frame in a slidable relationship with one another to permit linear movement therebetween;
   (d) means on said frame and said box for semi-permanently retaining said box in at least one position relative to said frame, said coacting guide means permits vertical linear movement between said box and said frame, and said retaining means is adapted to alternatively secure said box in an upper or a lower position with respect to said frame, said retaining means includes a pair of spring biased hook members mounted on said box and a corresponding pair of stop members mounted on said frame for receiving and releasably retaining said hook members.

2. The apparatus as described in claim 1, further comprising means on said box for retaining the battery inside said box.

3. The apparatus as described in claim 1, wherein said box is open at the top to permit access to the battery.

4. The apparatus as described in claim 1, wherein:
   (a) said stop members are perforated channels which extend outwardly from either end of said mounting frame; and
   (b) said hook members are pivotally attached at one end portion to said box for removable insertion of a second free end portion thereof into a perforation of said channel to support said box on said mounting frame.

5. The apparatus as described in claim 1, wherein the apparatus is constructed of stainless steel.

6. The apparatus as described in claim 1 wherein:
   (a) said stop members each have at least upper and lower spaced apart portions for receiving and releasably retaining said hook members so that said box is in upper position when said hook members are retained by said upper portions and in said lower position when said hook members are retained by said lower portions.

* * * * *